US006565627B1

(12) United States Patent
Golden et al.

(10) Patent No.: US 6,565,627 B1
(45) Date of Patent: May 20, 2003

(54) SELF-SUPPORTED STRUCTURED ADSORBENT FOR GAS SEPARATION

(75) Inventors: Timothy Christopher Golden, Allentown, PA (US); Catherine Marie Anne Golden, Allentown, PA (US); Daniel Patrick Zwilling, Drexel Hill, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/094,362

(22) Filed: Mar. 8, 2002

(51) Int. Cl.[7] .............................................. B01D 53/047
(52) U.S. Cl. ............................... 95/96; 95/100; 95/130; 95/139; 95/140; 95/143
(58) Field of Search ............................... 95/96–103, 130, 95/139, 140, 143, 901; 96/108, 130, 135, 143, 153, 154

(56) References Cited

U.S. PATENT DOCUMENTS

| | | | |
|---|---|---|---|
| 3,176,444 A | | 4/1965 | Kiyonaga ...................... 55/26 |
| 3,430,418 A | | 3/1969 | Wagner ......................... 55/25 |
| 3,564,816 A | | 2/1971 | Batta ............................ 55/26 |
| 3,986,849 A | | 10/1976 | Fuderer et al. ................. 55/25 |
| 4,046,525 A | * | 9/1977 | Matsuo et al. ................ 95/147 |
| 4,077,779 A | * | 3/1978 | Sircar et al. ................... 95/26 |
| 4,181,513 A | * | 1/1980 | Fukuda et al. ................. 96/153 |
| 4,194,891 A | * | 3/1980 | Earls et al. .................... 95/98 |
| 4,194,892 A | * | 3/1980 | Jones et al. .................... 95/95 |
| 4,217,386 A | * | 8/1980 | Arons et al. .................. 428/198 |
| 4,234,326 A | | 11/1980 | Bailey et al. ................. 55/278 |
| 4,391,616 A | * | 7/1983 | Imamura ....................... 95/92 |
| 4,702,903 A | | 10/1987 | Keefer ......................... 423/359 |
| 4,801,308 A | | 1/1989 | Keefer ......................... 55/25 |
| 4,869,894 A | * | 9/1989 | Wang et al. .................. 423/650 |
| 4,963,339 A | * | 10/1990 | Krishnamurthy et al. .. 423/437.2 |
| 4,968,329 A | | 11/1990 | Keefer ......................... 55/25 |
| 5,082,473 A | | 1/1992 | Keefer ......................... 55/25 |
| 5,096,469 A | * | 3/1992 | Keefer ......................... 95/92 |
| 5,122,164 A | * | 6/1992 | Hirooka et al. ................ 95/26 |
| 5,124,856 A | * | 6/1992 | Brown et al. ............. 360/97.03 |
| 5,250,088 A | | 10/1993 | Yamaguchi et al. ............ 95/98 |
| 5,256,172 A | * | 10/1993 | Keefer ......................... 423/230 |
| 5,338,450 A | * | 8/1994 | Maurer ........................ 210/286 |
| 5,389,350 A | * | 2/1995 | Freeman et al. .............. 423/230 |
| 5,772,738 A | * | 6/1998 | Muraoka ...................... 96/129 |
| 5,925,168 A | * | 7/1999 | Judkins et al. ................. 95/27 |
| 5,980,616 A | * | 11/1999 | Johnson et al. ............... 96/135 |
| 6,051,050 A | * | 4/2000 | Keefer et al. .................. 95/96 |
| 6,056,804 A | * | 5/2000 | Keefer et al. .................. 95/96 |
| 6,176,897 B1 | * | 1/2001 | Keefer ......................... 95/98 |
| 6,200,368 B1 | * | 3/2001 | Guerin et al. ................. 96/135 |
| 6,228,152 B1 | * | 5/2001 | Guerin et al. ................. 96/135 |
| 6,231,644 B1 | * | 5/2001 | Jain et al. ..................... 95/96 |
| 6,293,998 B1 | * | 9/2001 | Dolan et al. ................... 95/96 |
| 6,364,936 B1 | * | 4/2002 | Rood et al. ................... 95/115 |
| 6,379,437 B1 | * | 4/2002 | Heinonen et al. ............. 96/135 |
| 6,379,438 B1 | * | 4/2002 | Schneider et al. ............ 96/154 |
| 6,413,303 B2 | * | 7/2002 | Gelderland et al. ........... 96/135 |
| 6,454,834 B1 | * | 9/2002 | Livingstone et al. .......... 95/11 |

* cited by examiner

Primary Examiner—Robert H. Spitzer
(74) Attorney, Agent, or Firm—Keith D. Gourley

(57) ABSTRACT

A rapid pressure swing adsorption (RPSA) process includes the use of an adsorbent fabric. The fabric can be self-supporting, have an average pore diameter greater than 5 Å and/or have a carbon dioxide mass transfer coefficient of at least 0.5 sec$^{-1}$. Activated carbon cloths can be suitable for use as the adsorbent fabric. The process can be used to prepare high purity hydrogen and other products. Systems including the adsorbent fabric outperform systems lacking such fabrics in RPSA applications.

25 Claims, 2 Drawing Sheets

SELF-SUPPORTED STRUCTURED ADSORBENT FOR GAS SEPARATION

BACKGROUND OF THE INVENTION

This invention relates to pressure swing adsorption (PSA) processes, and more particularly to hydrogen production via pressure swing adsorption processes.

The increasing demand for hydrogen, particularly in petroleum refining and processing has provided a strong economic motivation to develop processes to recover hydrogen from refinery fuel gas, coke oven gas and other similar sources as well as from more traditional sources such as reformer off-gas. For most applications, a high purity hydrogen product is required.

The process of production and recovery of hydrogen by steam and/or air reforming of hydrocarbon rich gas streams, such as natural gas, naphtha, or other mixtures of low molecular weight hydrocarbons, is well known in the art. Typical commercial sources for the production of hydrogen include reforming of natural gas or partial oxidation of various hydrocarbons. The reforming is carried out by reacting the hydrocarbon with steam and/or with oxygen-containing gas (e.g., air or oxygen-enriched air), producing a hydrogen gas stream containing accompanying amounts of oxides of carbon, water, residual methane and nitrogen. Unless recovery of carbon monoxide is desired, the carbon monoxide is customarily converted to carbon dioxide by water gas shift reaction to maximize the hydrogen content in the stream. Typically, this gas stream is then sent to a PSA unit. Other hydrogen-rich gas sources that can be upgraded by PSA technology to a high purity product include refinery off-gases with $C_1$–$C_6$ hydrocarbon contaminants. See, e.g., U.S. Pat. No. 3,176,444 to Kiyonaga.

In PSA processes, a multi-component gas is passed to at least one of a plurality of adsorption beds at an elevated pressure to adsorb at least one strongly adsorbed component while at least one relatively weakly adsorbed component passes through. In the case of hydrogen production via pressure swing adsorption ($H_2$ PSA), $H_2$ is the weakly adsorbed component, which passes through the bed. See, e.g., U.S. Pat. No. 3,430,418 to Wagner, U.S. Pat. No. 3,564,816 to Batta and U.S. Pat. No. 3,986,849 to Fuderer et al. At a defined time, the feed step is discontinued and the adsorption bed is depressurized in one or more steps, which permit essentially pure $H_2$ product to exit the bed. Then a countercurrent desorption step is carried out, followed by countercurrent purge and repressurization. $H_2$ PSA vessels generally contain a mixture of activated carbon, for bulk $CO_2$ and $CH_4$ removal, followed by a molecular sieve for CO and $N_2$ removal. See, e.g., U.S. Pat. No. 3,430,418 to Wagner.

Hydrogen production via pressure swing adsorption is a multi-million dollar industry supplying high purity hydrogen for chemical producing industries, metal refining industries and other related industries. The cost of hydrogen from integrated reformer/PSA systems is impacted by both the capital and operating costs of the system. Clearly, economic production of hydrogen requires as low as possible operating and capital costs. Capital cost is largely dictated by the size of the reformer and the size of the PSA beds. PSA bed size decreases as the hydrogen productivity (lb-moles of hydrogen produced/bed volume) of the PSA increases. Hydrogen productivity can be increased by either improved process cycles or improved adsorbents. The size of the reformer is impacted mostly by the hydrogen recovery of the PSA. Improvements in hydrogen recovery in the PSA result in smaller reformer size (as there is a diminished need to produce hydrogen out of the reformer because of better recovery in the PSA). Improvements in hydrogen recovery also result in a reduced demand for reformer feed gas, i.e., natural gas, which generally constitutes the largest operating cost of the reformer. Hydrogen recovery in the PSA can also be improved by either improved process cycles or improved adsorbents.

There are a number of patents describing the use of structured adsorbents for gas separation by pressure swing adsorption. However, these patents do not address the use of self-supported adsorbents for separation of gases other than air but rather of an adsorbent mass containing the active adsorbent as well as a support and/or spacing system.

U.S. Pat. No. 4,234,326 to Bailey et al. relates to the use of activated carbon cloth in adsorptive filters for air purification. The patent states that the advantage of using a flexible charcoal cloth is that it offers a much lower resistance to gas flow compared to a granular adsorbent and a comparable adsorptive capacity. The patent describes a filter comprising layers of charcoal fabric arranged in various ways to accommodate different flow configurations, but preferentially positioned parallel to the direction of the gas flow. The patent also discloses the need to separate the adsorbent fabric layers by air-permeable layers of glass fiber, wool fiber or open cell foam, with a thickness between 0.1 and 1 mm. However, the patent does not address the use of such an adsorbent cloth in a cyclic adsorptive process and does not teach the benefits of fast mass transfer in a fast cycle adsorption process. Further, this adsorptive filter is not regenerated, but disposed of after it becomes spent.

U.S. Pat. Nos. 6,176,897; 6,056,804; 6,051,050; 5,256,172; 5,096,469; 5,082,473; 4,968,329; 4,801,308 and 4,702,903 to Keefer et al. disclose rapid pressure swing adsorption devices for gas separation, which require the use of adsorbent sheets. However, the adsorbent sheets depicted in the Keefer et al. patents always consist of an adsorbent material with a reinforcement material and with spacers between the sheets to establish flow channels in a flow direction tangential to the sheets and between adjacent pairs of sheets. The adsorbent sheets described can be made in various configurations (rectangular, annular stack, spiral-wound, etc.) but always include a support for the adsorbent in the form of an aluminum foil, a metallic mesh, or a matrix which can be woven, non-woven, ceramic or wool. The Keefer et al. patents do not teach the use of a self-supported adsorbent in separation of hydrogen.

U.S. Pat. No. 5,338,450 to Maurer describes the apparatus used in a thermal swing adsorption (TSA) system for gas purification. The apparatus consists of a cylinder containing a spirally wound adsorbent bed. The fluid streams to be treated and recovered after treatment in the bed circulate radially through the adsorbent layers. The adsorbent layers are comprised of adsorbent particles separated by inlet and outlet screens. An impermeable wall is also wrapped between the inlet and outlet screens defining an inlet and an outlet channel between said wall and, respectively, the inlet and the outlet screen for, respectively, distributing and collecting the fluid streams. The patent teaches that since the gas is circulated radially, through the thickness of the adsorbent layers, screens are necessary to retain and form the layers, and an impermeable wall is required to create the channels for fluid circulation.

U.S. Pat. No. 5,389,350 to Freeman et al. describes the manufacture of fibrous activated carbon material from polyarylamides carbonization, the final adsorbent product being in various possible forms including woven or knitted cloth or non-woven fabric. The patent teaches the use of those adsorbing materials for $CO_2$ adsorption and particularly $CO_2$ removal from air. However, rather than emphasizing the use of those adsorbents in a self-supported fashion and describing the physical properties of the materials, which would benefit a PSA gas separation process and their integration the disclosed system, the patent provides a detailed description of the various steps of their manufacturing process.

The earlier patent literature contains a large number of patents describing conventional pressure swing adsorption cycle processes for gas separation where the cycle time is on the order of several minutes. U.S. Pat. No. 3,430,418 to Wagner teaches the use of a four-bed PSA process for hydrogen purification with a total cycle time of 32 or 48 minutes, wherein the on-line time or feed time is a quarter of the total cycle time. U.S. Pat. No. 3,564,816 to Batta teaches the use of a four-bed PSA process for air separation at a cycle time of 12 or 24 minutes and for hydrogen/nitrogen separation at a cycle time of 28 minutes. In a more recent U.S. Pat. No. 5,250,088 by Yamaguchi et al., a four-bed PSA system is operated at a cycle time of 15 or 30 minutes for hydrogen purification. Clearly, the cycle time of PSA systems using conventional adsorbents beads or granules is usually at least several minutes.

In the more recent patents relating the art of rapid pressure swing adsorption, the cycle time is much shorter, on the order of seconds or even fractions of a second. U.S. Pat. No. 6,231,644 to Jain et al. describes an improved air separation process utilizing a monolithic adsorbent material where the cycle time is 35 seconds. U.S. Pat. No. 6,176,897 B1 to Keefer et al. and U.S. Pat. No. 6,056,804 to Keefer et al. claim the operation of ultra rapid PSA system using adsorbent laminate modules at cyclic frequency of 100 cycles per minute which corresponds to a cycle time of 0.6 second and even possibly as high as 600 cycles per minute (0.1 second cycle time). Those patents illustrate the new generation of rapid pressure adsorption systems, operating at very short cycle times and necessitating novel adsorbent configurations, process cycle and mechanical device innovations.

Accordingly, it is desired to provide an improved system for rapid PSA. It is further desired to provide such systems comprising the use of improved adsorbents.

All references cited herein are incorporated herein by reference in their entireties.

BRIEF SUMMARY OF THE INVENTION

Accordingly, the invention provides a pressure swing adsorption process for recovering a product gas from a feed gas, said process comprising:

supplying a pressure swing adsorption apparatus comprising an adsorbent fabric, wherein said adsorbent fabric is self-supported, has an average pore diameter greater than 5 Å and has a carbon dioxide mass transfer coefficient of at least 0.5 $sec^{-1}$;

feeding a feed gas into said pressure swing adsorption apparatus during a feed period not exceeding 100 seconds; and recovering said product gas from said pressure swing adsorption apparatus.

Also provided is a pressure swing adsorption process for recovering a product gas from a feed gas, said process comprising:

supplying a pressure swing adsorption apparatus comprising an adsorbent fabric, wherein said adsorbent fabric is self-supported and has a carbon dioxide mass transfer coefficient of at least 0.5 $sec^{-1}$;

feeding a feed gas into said pressure swing adsorption apparatus during a feed period not exceeding 100 seconds; and recovering said product gas from said pressure swing adsorption apparatus, wherein said product gas consists essentially of hydrogen.

BRIEF DESCRIPTION OF SEVERAL VIEWS OF THE DRAWINGS

The invention will be described in conjunction with the following drawings wherein.

DETAILED DESCRIPTION OF THE INVENTION

Figure 1:
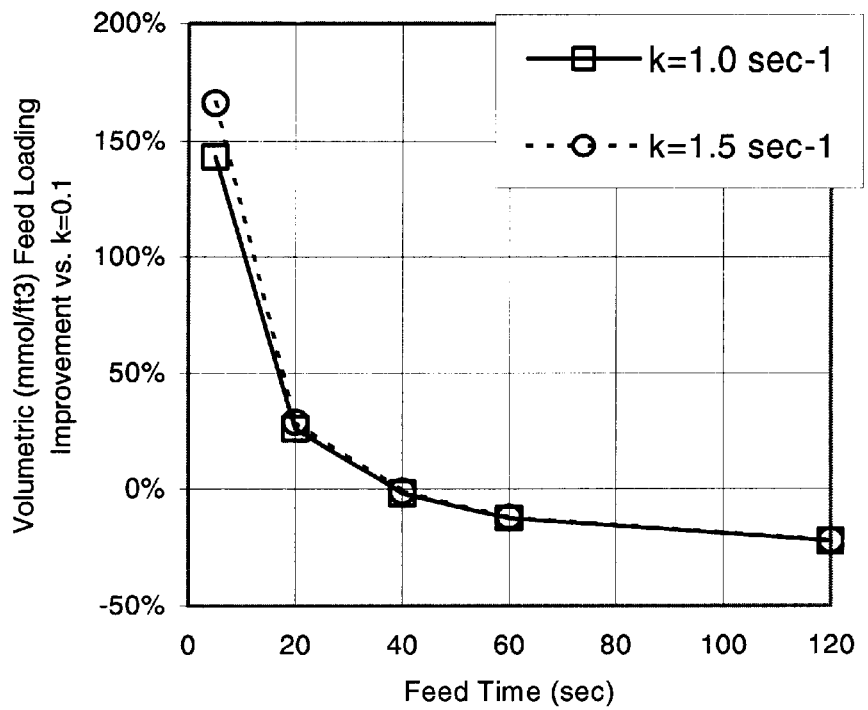
FIG. 1 is a graph showing a percent increase in loading as a function of time on feed for activated carbon fabric relative to activated carbon granule.

Conventional gas separation by PSA is usually performed using beds packed with adsorbent beads or granules. In order to reduce the size of the existing PSA systems and still maintain the same product throughput, the process cycle time needs to be reduced and, consequently, the process stream flow rate needs to be increased. Maintaining a low pressure drop and achieving a fast transfer rate of the sorbate/molecules from the gas to the adsorbed phase becomes crucial in a rapid PSA configuration when the molecules residence time in the adsorber is shortened.

The mass transfer/pressure drop characteristics of conventional packed beds do not allow operating the process at fast cycles (more than a few cycles per minute). New adsorbent configurations, which present a plurality of channels with less resistance to gas flow and, therefore, less pressure drop have been selected as good candidates for rapid PSA systems. Such materials also require fast mass transfer and must exhibit large film and solid mass transfer coefficients, which translate into very small channels as well as very thin adsorbent walls. Simultaneously, the working capacity of the materials must be high enough and the void volume sufficiently small to minimize the adsorber's size and operate at good product recovery.

Various material configurations satisfy most of the requirements listed above, but rarely offer all of those advantages simultaneously. For instance, adsorbent beads used in a traditional packed bed will exhibit high pressure drop at large flow rates. Adsorbent monoliths would be required to have very high cell density (several hundred to over one thousand cells per square inch or about ⅙ as many per square centimeter) in order to have fast adsorption kinetics as well as reasonable bulk density. Such high-density monoliths are not available today. In the case of laminate structures, the thickness of the adsorbent sheets and the thickness of the space between consecutive sheets need to be very small to satisfy the same requirements, which results in the need for external support and spacing systems.

Adsorbent fabrics, however, can exhibit the combined benefits of conventional beads as well as structured adsorbents for rapid PSA applications (RPSA). Fast kinetics, low-pressure drop and no requirement for external support or spacers characterize those materials and make them excellent candidates for RPSA processes. It is a goal of the current invention to describe the use of adsorbent fabrics with fast solid phase diffusion rate in fast cycle gas separation pressure swing adsorption systems.

Thus, this invention provides a PSA process for recovering a product gas from a feed gas using an adsorbent fabric. As used herein, the term "PSA" covers not only the strictly speaking PSA processes, but also similar processes such as VSA (Vacuum Swing Adsorption) and MPSA (Mixed Pressure Swing Adsorption).

The fabric preferably contains pores having an average diameter in excess of that necessary to separate oxygen from nitrogen in air. More particularly, adsorbent fabrics of the invention have average pore diameters greater than 5 Å, and preferably from about 12 Å to about 15 Å.

The invention flows from the surprising discovery that the thickness of the adsorbent fabric is greater than that for the monolith, but the adsorbent fabric shows a higher mass transfer rate. The adsorbent fabric of this invention is selected from a group of equilibrium selective materials with a preferred carbon dioxide mass transfer coefficient of at least $0.5$ $sec^{-1}$, more preferably at least $1.0$ $sec^{-1}$. The thickness of the fabric is preferably 0.5 mm or smaller.

The present invention enjoys the benefits of using an adsorbent fabric in fast cycle gas separations for its combined kinetics and equilibrium characteristics, which enhance the overall fast cycle process performance of a rapid pressure swing adsorption system. Adsorption mass transfer dominates the separation at short cycle time. Furthermore, the lower attrition rate and higher mechanical strength of a flexible adsorbent fabric are additional advantages.

The adsorbent fabric preferably comprises activated carbon. In certain embodiments, the self-supported fabric further comprises other adsorbents including zeolites, alumina, silica gel and mixtures thereof. The adsorbent fabric can be chemically treated or modified by impregnation with metal salts, oxidation, reduction and/or ion exchange.

The adsorbent fabric is less sensitive to attrition problems in a very fast cycle environment compared to beads, monoliths or any other more rigid adsorbent structure. The apparatus of the invention is particularly suitable for use in processes wherein feed times are less than two minutes, preferably less than 100 seconds, more preferably less than 40 seconds. Our related application having Ser. No. 10/094,185 the title ACTIVATED CARBON AS SOLE ADSORBENT IN RAPID CYCLE PSA, filed on the same day as this application, also discloses an apparatus that is particularly suitable for use in rapid cycle processes.

The adsorbent fabric can be arranged in various different configurations, which conserve all the benefits of the fabric. The preferred configurations are a laminate (parallel sheets) and a spiral wound structure. The fabric is preferably self-supporting (i.e., it is devoid of spacing elements or it contains its own spacing elements made out of the active adsorbent and/or inert material; no external matrix is required to support the adsorbent). Thus, the adsorbent fabrics that are the subject of the present invention offer the simultaneous advantages of (1) good volumetric equilibrium capacity (2) low pressure drop and (3) very fast mass transfer without the need for an external and non-adsorbent support or spacing device.

In certain embodiments, the apparatus of the invention includes at least one spacer, the at least one spacer is provided between opposing layers of the adsorbent fabric, such that the opposing layers of the adsorbent fabric are maintained in spaced-apart relation to one another, at least in the vicinity of the at least one spacer. The spacer is preferably comprised of an active adsorbent material (e.g., activated carbon sheets, gas diffusion layers, other carbon fabrics) and/or an inert adsorbent material (e.g., wire mesh, ceramic fiber, open cell foam, etc.).

In certain embodiments, the apparatus of the invention includes an adsorbent monolith in addition to the adsorbent fabric. As used herein, the term "adsorbent monolith" means a rigid adsorbent solid. The monolith preferably comprises a solid adsorbent structure with parallel flow through channels in the axial direction of the adsorbent. This results in a typical "honeycomb" structure. The monolith is preferably used to complement the adsorbent qualities of the fabric. At least one monolith can be placed upstream and/or downstream of the fabric, and can also be placed between at least two fabrics.

In the process of the invention, components of a feedstock (preferably a gas) are adsorbed to the adsorbents in the apparatus to separate the desired product (preferably a gas) from the balance of the feedstock components. Suitable feed gases comprise a mixture of hydrogen and at least one other component selected from the group consisting of carbon dioxide, carbon monoxide, hydrocarbon, oxygen, argon and nitrogen. Gaseous mixtures comprising hydrogen, oxygen and nitrogen are preferred for use in the invention. The use of air as the gaseous mixture is excluded in certain embodiments (although air can be a component of the mixture in at least some embodiments). The invention is suitable for a variety of gas separations including $H_2$ purification, CO production, hydrocarbon removal or recovery and the like.

The product of the invention is preferably hydrogen gas of high purity. Thus, the invention is capable of providing product gas containing at least 99.9% hydrogen, preferably at least 99.99% hydrogen.

The feed gas is preferably provided at a temperature of 0 to 100° C., and fed into the apparatus at a feed pressure from 1.5 atm absolute to 40 atm absolute. Gas flow is preferably parallel or perpendicular to the fabric sheets, more preferably parallel.

The fabric is placed in the adsorption vessel in laminate or spiral wound form to effect the pressure drop. When loading fabric into the vessel, one has to be very careful that the leading edge of the fabric roll remains vertical. If the fabric is not very perpendicular to the vessel during loading, some fabric at the end of the vessel gets oriented perpendicular to the flow, resulting in high pressure drops.

The invention is illustrated below in more detail with reference to the following examples, but it should be understood that the present invention is not deemed to be limited thereto.

EXAMPLES

Example 1

Technical information on the working equilibrium capacity and the diffusion rates were collected experimentally for $CO_2$ adsorption on activated carbon fabric and compared to similar results gathered for a more conventional and high performance activated carbon granule material. Table 1 shows that the $CO_2$ equilibrium capacity at 30° C. on the fabric can be as good or better than that of the granules on a gravimetric basis.

TABLE 1

Comparison between activated carbon granules and fabric $CO_2$ equilibrium capacities.

| Adsorbent | Fabric | Granules | % Difference |
|---|---|---|---|
| Working Capacity, 0.5 to 5 atm (mlbmole/lb) | 3.7 | 2.8 | +32 |

Example 2

Table 2 shows the superior kinetics of a self-supported fabric of the invention. The $CO_2$ adsorption isotherms were obtained at 30° C. in a standard volumetric adsorption apparatus. The $CO_2$ uptakes were measured in a standard volumetric adsorption apparatus by measuring the decay in pressure as a function of time. Derivation of the linear driving force mass transfer coefficient is described in a number of references including "Principles of Adsorption and Adsorption Processes", D. Ruthven, John Wiley and Sons, 1984.

TABLE 2

Comparison of $CO_2$ diffusion rate constants for fabric, granules and monolith using a linear driving force model.

| Adsorbent | Fabric (0.42 mm thick) | Granules (2 mm diameter) | Monolith (0.27 mm thick) |
|---|---|---|---|
| Diffusion Rate Constant, k ($sec^{-1}$) | 1.5 | 0.1 | 0.55 |

The results in Table 2 are surprising. In general, the mass transfer rate increases as the diffusion length decreases. Clearly, the carbon granules with a 2 mm thickness have the slowest mass transfer rate as would be expected. However, unexpectedly, the thickness of the carbon fabric is greater than that for the monolith, but the carbon fabric shows a higher mass transfer rate.

Example 3

Simulations have also been performed to evaluate the impact of the adsorbent configuration on the overall RPSA system performance at various feed times. A typical 4-bed PSA process like that described in U.S. Pat. No. 3,430,416 was employed. The simulation was performed for a process gas at 250 psig (1.72 MPa) and 70° F. (21° C.) containing 25% $CO_2$ in $H_2$. The product purity was fixed at 1000 ppmv $CO_2$ in $H_2$ and the tailgas pressure at the bottom of the bed set at 1.6 atm. Sensitivity analysis of the $H_2$ recovery and the mass and volumetric loadings as functions of the adsorbent, the linear driving force mass transfer coefficient k and feed time were performed. Firstly, two activated carbon adsorbents in Table 2 were selected, namely a conventional high performance granule with a k of 0.1 $sec^{-1}$ and a fabric with a k of either 1.0 $sec^1$ or 1.5 $sec^{-1}$ Secondly, for each material, the time on feed was varied from 5 to 120 seconds. The assumption was made that all adsorbents have the same pressure drop characteristics, but adsorption isotherms and bulk densitites of the actual actual materials were used in the simulation.

Table 3 provides a summary of the mass and volumetric loading as well as the $H_2$ recovery obtained from the simulation for the various cases described above. Table 4 gives the corresponding $H_2$ recovery points and loadings increase for the fabrics relative to the granules.

TABLE 3

Volumetric and mass loadings and $H_2$ recovery for activated carbon fabrics and granules.

| | Granules k = 0.1 $sec^{-1}$ | | | Fabric k = 1.0 $sec^{-1}$ | | | Fabric k = 1.5 $sec^{-1}$ | | |
|---|---|---|---|---|---|---|---|---|---|
| feed time sec | vol loading mlbmol/$ft^3$ | Mass loading mlbmol/lb | $H_2$ Recovery % | Vol loading mlbmol/$ft^3$ | mass loading mlbmol/lb | $H_2$ Recovery % | Vol loading mlbmol/$ft^3$ | mass loading mlbmol/lb | $H_2$ Recovery % |
| 5 | 40.3 | 1.12 | 25.3 | 98.2 | 6.55 | 65.7 | 107.4 | 7.16 | 71.1 |
| 20 | 110.5 | 3.07 | 60.4 | 139.4 | 9.29 | 79.2 | 142.5 | 9.50 | 80.0 |
| 40 | 150.3 | 4.17 | 73.3 | 147.7 | 9.84 | 80.8 | 148.9 | 9.92 | 81.1 |
| 60 | 170.9 | 4.75 | 78.3 | 149.9 | 9.99 | 81.2 | 150.7 | 10.05 | 81.4 |
| 120 | 195.9 | 5.44 | 82.9 | 152.1 | 10.14 | 81.6 | 152.6 | 10.17 | 81.7 |

Results in Table 3 were obtained from a simulation of a 4-bed $H_2$ PSA.

TABLE 4

Relative increase in $H_2$ recovery points and in volumetric and mass percent loading for activated carbon fabrics compared to activated carbon granules.

| feed time; sec | Fabric k = 1.0 sec$^{-1}$ | | | Fabric k = 1.5 sec$^{-1}$ | | |
|---|---|---|---|---|---|---|
| | increase in volume loading; % | increase in mass loading; % | increase in $H_2$ recovery points | increase in volume loading; % | increase in mass loading; % | increase in $H_2$ recovery points |
| 5 | 143 | 484 | 40.4 | 166 | 539 | 45.8 |
| 20 | 26 | 203 | 18.9 | 29 | 209 | 19.7 |
| 40 | −2 | 136 | 7.6 | −1 | 138 | 7.8 |
| 60 | −12 | 110 | 2.9 | −12 | 112 | 3.1 |
| 120 | −22 | 86 | −1.2 | −22 | 87 | −1.1 |

Results in Table 4 were obtained from simulation of a 4-bed $H_2$ PSA.

Figure 2:
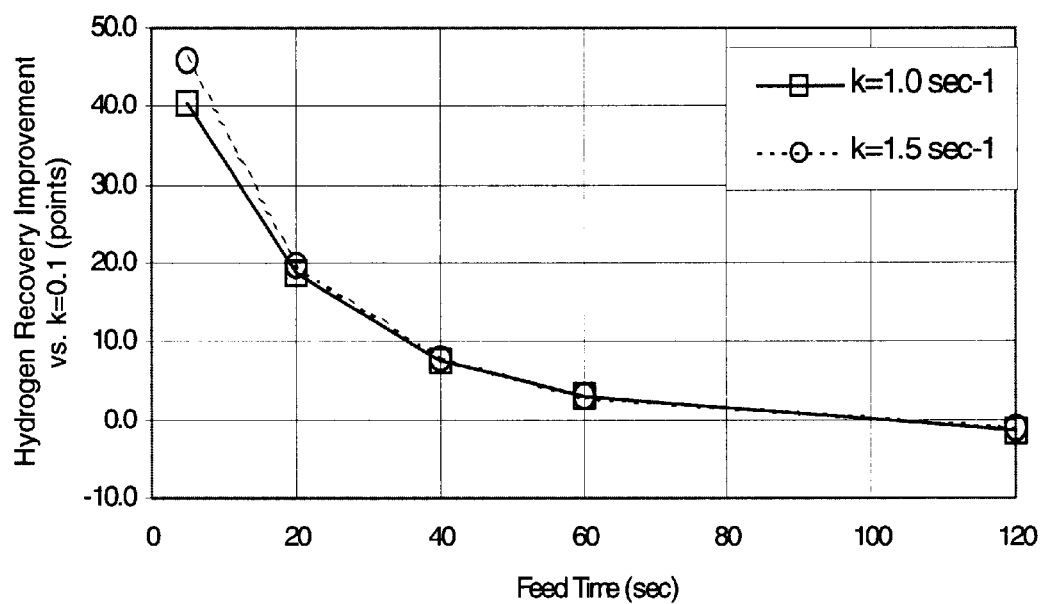
FIG. 2 is a graph showing an increase in $H_2$ recovery points as a function of time on feed for activated carbon fabric relative to activated carbon granule.

FIG. 1 shows the fabric percent loading increase comparative to the granules as a function of feed time and for two k values. FIG. 2 shows the fabric increase in $H_2$ points comparative to the granules as a function of feed time and for two k values.

It is clear that the use of an adsorbent fabric in a short cycle time is advantageous compared to the conventional granular adsorptive material and that variation in the fabric LDF mass transfer rate constant k affects the volumetric loading and the product recovery. The volumetric loading of the fabric becomes superior to that of the granules below 40 sec on feed while the $H_2$ recovery becomes higher than that of the granules below about 105 sec on feed. For the fabric with a k of 1.5 sec$^{-1}$, as much as 170% increase in volumetric loading and 46 points increase in $H_2$ recovery are observed compared to the granules results. For both the fabric volumetric loading and $H_2$ recovery, it is only below 20 seconds on feed that the profiles corresponding to k values of 1.0 and 1.5 sec$^{-1}$ can clearly be differentiated with higher performance results for the higher k value It is clear from the foregoing examples that it is much more advantageous to utilize the fabric adsorbent at shorter cycle times where mass transfer kinetics becomes the dominant separation mechanism. At longer cycle times where the separation is dominated by adsorption equilibrium, the variation in the adsorbent mass transfer rate coefficient has only a weak effect on the overall separation performance. In that case, this advantage of using an adsorbent fabric rather than a conventional granular material is lost.

Example 4

Figure 3:
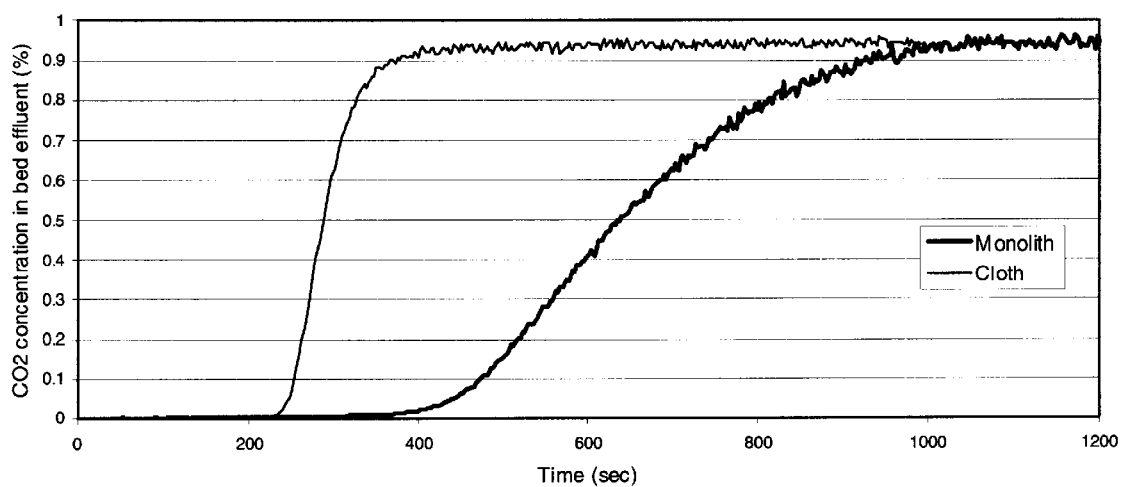
FIG. 3 is a carbon dioxide breakthrough curve on activated carbon fabric and an activated carbon monolith.

$CO_2$ breakthrough curves were obtained on samples of activated carbon monolith and activated carbon fabric at 25° C. and 50 psig with a feed composition of 1% $CO_2$ in He and a feed flow rate of 2.5 lbmoles/hr/ft$^2$. The bed diameter was about 1 inch (2.5 cm) and the bed length was about 4 inches (10 cm). The results of the breakthrough curve measurements are shown in FIG. 3. The results show that while the monolith has higher $CO_2$ capacity (longer time to $CO_2$ breakthrough), it also has a longer mass transfer zone. The $CO_2$ mass transfer zones are calculated to be 0.7 and 1.7 inches for the fabric and monolith, respectively.

From this breakthrough data and equilibrium isotherms of the performance of a four-bed PSA using a 4/1/1 cycle was simulated for the monolith alone, the fabric alone and a composite bed with 50 vol % monolith on the feed end of the bed and 50 vol % fabric on the product end of the bed. The feed pressure was 120 psig, the inlet feed composition was 20% $CO_2$ and 80% $H_2$ and the product purity was 1000 ppm $CO_2$ in $H_2$.

The simulation results are shown in Table 5. The results show that the fabric outperforms the monolith despite a lower equilibrium capacity. This indicates the importance of mass transfer rate on process performance at short cycle times. The interesting and unexpected result is that a combination of monolith plus fabric outperforms either adsorbent individually resulting in the highest $H_2$ recovery and the highest production rate. This result clearly shows that a layer of self-supported activated carbon fabric greatly improves the performance of the carbon monolith.

TABLE 5

Comparison of monolith, fabric and monolith plus fabric systems.

| Adsorbent | $H_2$ Recovery | Relative production |
|---|---|---|
| Monolith | 68.0% | 1.0 |
| Fabric | 77.7% | 1.25 |
| Monolith + Fabric | 77.9% | 1.29 |

While the invention has been described in detail and with reference to specific examples thereof, it will be apparent to one skilled in the art that various changes and modifications can be made therein without departing from the spirit and scope thereof.

What is claimed is:

1. A pressure swing adsorption process for recovering a product gas from a feed gas, said process comprising:

supplying a pressure swing adsorption apparatus comprising an adsorbent fabric, wherein said adsorbent fabric is self-supported, has an average pore diameter greater than 5 Å and has a carbon dioxide mass transfer coefficient of at least 0.5 sec$^{-1}$;

feeding a feed gas into said pressure swing adsorption apparatus during a feed period not exceeding 100 seconds; and recovering said product gas from said pressure swing adsorption apparatus.

2. The process of claim 1, wherein said adsorbent fabric comprises activated carbon.

3. The process of claim 2, wherein said adsorbent fabric further comprises at least one member selected from the group consisting of zeolites, alumina and silica gel.

4. The process of claim 2, wherein said adsorbent fabric consists essentially of activated carbon.

5. The process of claim 2, wherein said adsorbent fabric is modified prior to said supplying by impregnation with metal salts, oxidation, reduction and/or ion exchange.

6. The process of claim 2, wherein two sheets of said adsorbent fabric are arranged in parallel to each other.

7. The process of claim 6, wherein said two sheets of said adsorbent fabric are provided without additional spacers or flow channels.

8. The process of claim 6, wherein at least one spacer is provided between said two sheets of said adsorbent fabric, wherein said spacer comprises an active adsorbent material and/or an inert adsorbent material.

9. The process of claim 2, wherein said adsorbent fabric is arranged to form a spirally wound structure.

10. The process of claim 2, wherein said pressure swing adsorption apparatus further comprises an adsorbent monolith, and said process further comprises contacting said monolith with said feed gas upstream of said adsorbent fabric.

11. The process of claim 2, wherein said feed gas comprises a mixture of hydrogen and at least one other component selected from the group of carbon dioxide, carbon monoxide, hydrocarbon, oxygen, argon and nitrogen, provided that said feed gas is not air.

12. The process of claim 11, wherein said product gas comprises at least 99.9% hydrogen, and a rate of hydrogen recovery is at least 70%.

13. The process of claim 1, wherein said average pore diameter is 12–15 Å.

14. A pressure swing adsorption process for recovering a product gas from a feed gas, said process comprising:

supplying a pressure swing adsorption apparatus comprising an adsorbent fabric, wherein said adsorbent fabric is self-supported and has a carbon dioxide mass transfer coefficient of at least 0.5 $\sec^{-1}$;

feeding a feed gas into said pressure swing adsorption apparatus during a feed period not exceeding 100 seconds; and recovering said product gas from said pressure swing adsorption apparatus, wherein said product gas consists essentially of hydrogen.

15. The process of claim 14, wherein said adsorbent fabric comprises activated carbon.

16. The process of claim 15, wherein said adsorbent fabric further comprises at least one member selected from the group consisting of zeolites, alumina and silica gel.

17. The process of claim 15, wherein said adsorbent fabric consists essentially of activated carbon.

18. The process of claim 15, wherein said adsorbent fabric is modified prior to said supplying by impregnation with metal salts, oxidation, reduction and/or ion exchange.

19. The process of claim 15, wherein two sheets of said adsorbent fabric are arranged in parallel to each other.

20. The process of claim 19, wherein said two sheets of said adsorbent fabric are provided without additional spacers or flow channels.

21. The process of claim 19, wherein at least one spacer is provided between said two sheets of said adsorbent fabric, wherein said spacer comprises an active adsorbent material and/or an inert adsorbent material.

22. The process of claim 15, wherein said adsorbent fabric is arranged to form a spirally wound structure.

23. The process of claim 15, wherein said pressure swing adsorption apparatus further comprises an adsorbent monolith, and said process further comprises contacting said monolith with said feed gas upstream of said adsorbent fabric.

24. The process of claim 15, wherein said feed gas comprises a mixture of hydrogen and at least one other component selected from the group of carbon dioxide, carbon monoxide, hydrocarbon, oxygen, argon and nitrogen, provided that said feed gas is not air.

25. The process of claim 24, wherein said product gas comprises at least 99.9% hydrogen, and wherein a rate of hydrogen recovery is at least 70%.

* * * * *